Sept. 29, 1936.  L. M. DIETERICH  2,055,859

OPTICAL SYSTEM AND METHOD

Filed Nov. 16, 1933

INVENTOR
Ludwig M. Dieterich
BY
Blair, Curtis + Dunne
ATTORNEYS

Patented Sept. 29, 1936

2,055,859

UNITED STATES PATENT OFFICE 2,055,859

OPTICAL SYSTEM AND METHOD

Ludwig M. Dieterich, Los Angeles, Calif.

Application November 16, 1933, Serial No. 698,342

2 Claims. (Cl. 88—57)

This invention relates to a method and apparatus for controlling the relative values of speed and range of definition (sometimes called depth or focus) in an optical lens system, particularly and illustratively in a photographic lens system.

One of the objects of this invention is to provide a simple and thoroughly practical method and apparatus for modifying a given lens system, having a given speed and focal value and a resulting given depth of focus, to change the depth of focus while maintaining unimpaired the speed and focal value of the lens system. Another object is to provide an inexpensive and thoroughly practical accessory or attachment for or to a lens system for increasing the range of definition of the latter without reducing its speed or focal value. Another object is to provide a method and apparatus of the above-mentioned nature which can be readily and reliably put into practical effect to improve or enhance the effect of certain characteristics of a lens system without impairing certain others thereof. Another object is to provide a method and apparatus that will be well adapted to meet the varying conditions met with in practice. Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

Figure 1:
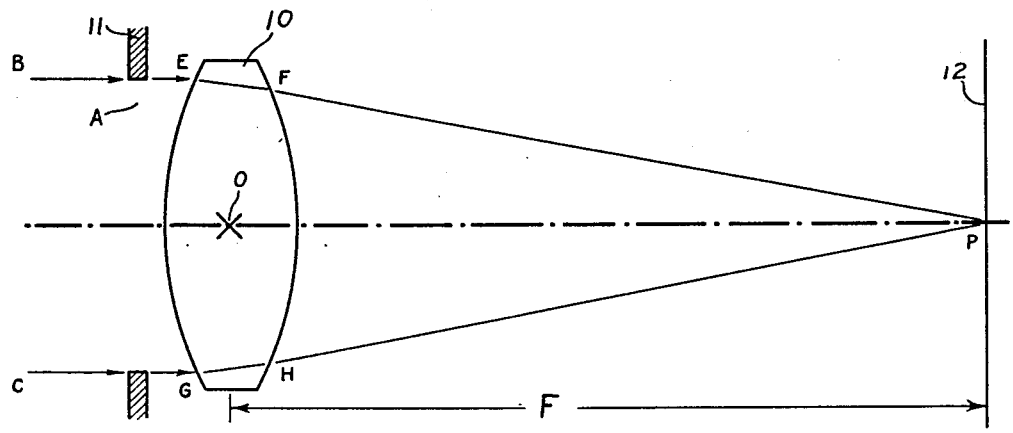
Figure 2:
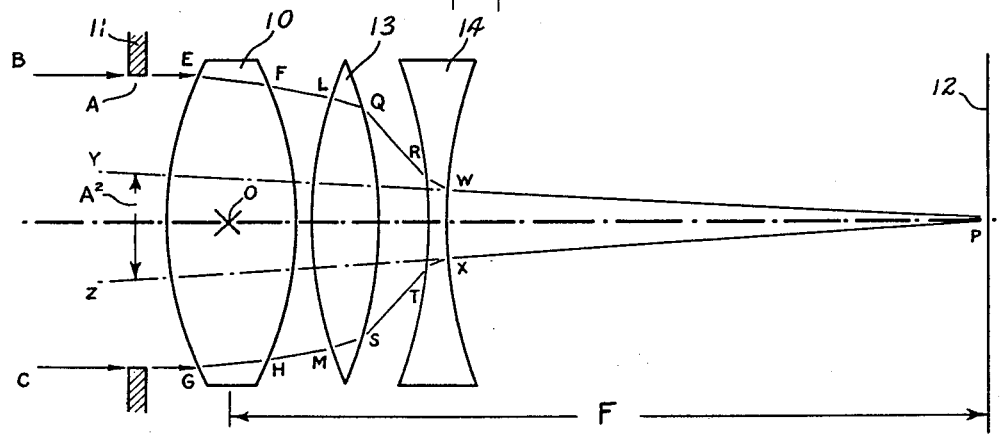
Figure 3:
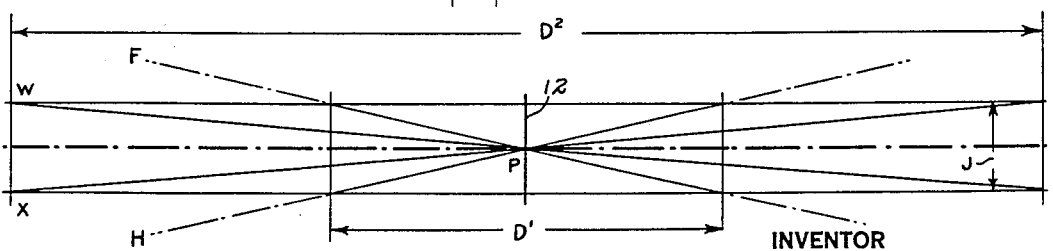

In the accompanying drawing in which the mechanical features of my invention are disclosed illustratively with respect to a photographic lens system, Figure 1 is a diagrammatic representation of a photographic lens system as heretofore constructed and having certain characteristics certain of which are to be modified;

Figure 2 is a diagrammatic optical representation of the mechanical features of my invention and of certain of its effects as applied to a lens system like that of Figure 1, and Figure 3 is a graphic representation on an enlarged scale showing, by comparison with certain results of the system of Figure 1, certain results achieved by my invention.

Similar reference characters refer to similar parts throughout the several views of the drawing.

In Figure 1 I have indicated, by way of illustration and diagrammatically, a photographic lens system 10 which may be of any suitable or heretofore known construction, being related, in any suitable or heretofore known manner to an opaque member 11 having therein an aperture A illustratively circular for the admission of light rays to the lens system 10 from the scene, object, or field of which an image is to be produced by the lens system 10; illustratively the images to be produced upon a light-sensitive member, such as a film or plate 12 positioned at the back focus of the lens system 10. The optical center of the optical system 10 is indicated at O and the focal value of the lens system 10 is, as is indicated in Figure 1, the distance F.

As conducive to a clearer understanding of certain features of my invention, certain heretofore known characteristics and actions of a lens system like that of Figure 1 might first be briefly considered. For example, the speed $f$ of the lens system 10, having a given focal value F, depends upon the amount of light entering the lens system through its free aperture A and hence depends upon the area of that aperture. Usually the aperture is circular and in that case of course the area of and the amount of light entering through the free aperture is a function of the diameter of the latter. The speed of a lens is expressed by the well known formula $$f = \frac{F}{D}$$

wherein $f$ denotes the speed of the lens, F its focal value, and D the diameter of its free aperture. In Figure 1 the free aperture is indicated at A. An increase or decrease in the area of the aperture A correspondingly increases or decreases the speed of the photographic lens system or the rate at which the light-sensitive surface 12 (film, plate, or the like) actinically reacts to the light rays brought onto it by the lens system. When an exposure of the light-sensitive surface 12 takes place, as by the actuation of a suitable shutter, there is produced on the surface 12 a latent image of the object in the field of the lens system 10.

Furthermore, the definition or sharpness of the image produced upon the surface 12, with a lens system having a focal value F as in Figure 1, depends upon the distance of the object from the optical center O of the lens system 10. The definition or sharpness of the image is a maximum when the plane of the object is at a certain distance from the optical center and the lens system or camera is said to be "focused" upon the object. Object points of less or greater distance from the optical center than the above-mentioned distance of the object plane at which the definition is a maximum produce upon the light-sensitive surface 12 images of less definition, sharpness, or clarity, for the object points become projected upon the surface 12 in the form of disks or circles, the images of such object points now becoming image disks rather than image points. The size of these image disks, known in the art as circles of confusion, increase with the displacement of the object points, along the optical axis, from the above-mentioned distance of the image plane from the lens at which the lens system may be said, as above noted, to be focused. The greater the circles of confusion, the less definition or sharpness results at the image plane or on the light-sensitive surface 12, and hence upon the resultant or subsequently developed or produced photograph, film, plate, whether positive or negative.

So long as these circles of confusion do not exceed a certain size or diameter satisfactory and acceptable definition or sharpness of latent and ultimate image is produced, as is well known in the art, the permissible size or diameter of circles of confusion depending, as is also known in the art, upon various factors, such as the character of the object or scene, the resolving efficiency of the retina of the human eye, the manner of presentation of the latent or ultimate image to the eye, and others, and accordingly, with a lens system like that of Figure 1, having inherently, or having been adjusted to have, a given focus F, a certain range of departure of the object point in a direction along the optical axis and both toward and away from the optical axis O of the lens system 10 from the mathematically or theoretically critical or optimum distance of the object plane from the optical center may take place, the range being limited by the maximum permissible size of circles of confusion on the image plane or light-sensitive surface 12. This is known in the art as "depth of focus".

To make this somewhat clearer and referring again to Figure 1, let it be assumed that parallel light rays B and C, emanating from the object point, enter the aperture A, the object point being at the critical or optimum distance from the optical center O. These light rays B and C are converged, as at B, E, F, P and C, G, H, P onto the light-sensitive surface 12, intersecting in the plane of the latter and at the point P, to produce a latent image point P, on the light-sensitive surface 12.

In Figure 3 I have shown on an enlarged scale, the intersection at the point P of these two light rays F, P and H, P making an angle F, P, H. Actually, however, and as is well understood, the image point P is the point of intersection of an infinite number of rays which make up the pencil of rays of which the rays B, E, F, P and C, G, H, P are illustratively only two. If, now, the permissible size or diameter of circles of confusion is the diameter J of Figure 3, the depth of focus of the system of Figure 1 is the dimension $D^1$ on Figure 3 and that is equivalent to twice the altitude of cone whose base is a circle having a diameter equal to the diameter J of the maximum or permissible circle of confusion and whose angle is the angle F, P, H.

The above-mentioned range of departure toward or away from the lens system of the object point from the theoretically critical or otherwise optimum distance of the object plane from the optical center becomes a function of this depth of focus $D^1$.

As heretofore practiced, the depth of focus $D^1$ has imposed numerous limitations upon lens systems and their application and range of use, and if, with a lens system like that of Figure 1, it is desired to increase the depth of focus, in the effort to lessen such limitations, it became necessary to decrease the size or area of the free aperture A whereby, as will be clear from a consideration of Figures 1 and 3 as thus far described, the angle F, P, H becomes lessened so that the altitude of the cone which determines the depth of focus $D^1$ becomes increased and thus the depth of focus somewhat increased; but to do this has resulted in decreasing the speed of the lens and has thus injected other defects and limitations and disadvantages.

Now according to my invention and referring now to Figure 2, in which again the lens system 10, free aperture A and light-sensitive surface or image plane 12 are reproduced, I am enabled, with the same lens system, to eliminate such disadvantages and limitations and deficiencies as have just been noted. Between the lens 10 and the image plane 12 and positioned along the optical axis, I interpose two lenses 13 and 14, lens 13 being a positive lens and lens 14 being a negative lens.

Light rays B and C again enter through the same aperture A and pass through the lens system 10, being bent, refracted, or the like, as is indicated by the lines B, E, F, L and C, G, H, M, it being noted that the angle between rays F, L and H, M is the same as the angle F, P, H of Figures 1 and 3, above-mentioned.

These light rays, representing, of course, only two out of the pencil of light rays that emanate from the point image and pass through the aperture A, are then passed through the positive lens 13 as at L, Q, R and M, S, T, being converged whence they are passed through the negative lens 10 along the paths R, W, P and T, X, P, converging in the point P just as where the rays B and C of Figure 1. However, the angle W, P, X of Figure 2 is now vastly smaller than the angle F, P, H of Figure 1.

If, now, with this greatly reduced angle, the new depth of focus is ascertained by reference now to Figure 3, to which the rays W, P and X, P will be seen to be transferred, the new depth of focus $D^2$, being twice the altitude of a cone of rays whose base is the same circle J corresponding to the maximum circle of confusion which restricted the depth of focus of the lens system of Figure 1, and whose angle W, P, X is vastly smaller than the angle F, P, H.

The lenses 13 and 14 have, of course, suitable curvatures and spacings and indices of refraction to successively change the angles of the emerging light rays in the ratios indicated in Figure 2, namely, the ratio of the angle between rays Q, R and S, T to the angle between rays F, L and H, M (the rays emerging from the lens system 10), and the ratio of the angle W, P, X to the angle between rays Q, R and S, T, the focal value F preferably remaining unchanged.

Viewed in another light and still referring to Figure 2, one aspect of the results of my invention may be gaged if rays P, W and P, X are extended toward the left as along the line W, Y and X, Z, the depth of focus $D^2$ (Figure 2) achieved by my invention is comparable to an increased depth of focus achieved by stopping down or diminishing the size of the aperture A to a size $A^2$. Yet, I achieve this increased depth of focus without, however, affecting the speed of the lens system 10 for the same light aperture A initially effective to give the lens system 10 its high speed is still available and is still effective to maintain the same initial high speed. Thus, there is no impairment of actinic reaction on the film or plate 12, an impairment which would limit the extent to which the lens system of Figure 1, without the aid of my invention, would have limited the extent to which the free aperture could have been reduced in size.

Thus, it will be seen that there has been provided in this invention a method and apparatus in which the several objects hereinbefore noted, together with many thoroughly practical advantages are successfully achieved. It will be seen that I am enabled to maintain the speed $f$ of the lens system, the speed being determined by the formula $$f = \frac{F}{A}$$

and the focal value F likewise maintained, while the depth of focus can be increased to any desired value, depending upon the relative angles at which the accessory lens or lenses either alone or in succession bend the emerging light rays to increase the altitude or axial length of the cone relative to the axial length of the cone produced by the lens system to be modified, all while maintaining the circular base of the cone within the diameter of the maximum permissible circles of confusion. It will furthermore be seen that, by means of my invention, for greater depth of focus, I have increased the speed of the lens system; in other words, by means of my invention, a desired increase of depth of focus is achieved without sacrifice of speed, a sacrifice which heretofore was unavoidable.

As many possible embodiments may be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

I claim:—

1. In apparatus of the character described, in combination, an optical lens system having a given aperture and focal value and means for changing the depth of focus of said optical system without affecting the ratio of effective aperture to focal value, said means comprising lens means interposed between said lens system and the image plane thereof, said lens means having a lens near said optical lens system and having the optical characteristic of receiving light rays from said lens system and converging them at a larger angle of convergence than the angle of convergence of light rays by said lens system, and another lens adjacent said first-mentioned lens on the side thereof toward the image plane and having the optical characteristic of receiving said light rays converged by said first lens and converging them at the focus of said lens system at an angle of convergence less than the angle of convergence of light rays emanating from said lens system.

2. In apparatus of the character described, in combination, an optical system having a given aperture and focal value and means for changing the depth of focus of said optical system without affecting the ratio of effective aperture to focal value, said means comprising a positive lens positioned to receive therethrough light rays from said optical system and a negative lens positioned to receive light rays from said positive lens, said positive lens and negative lens being arranged in that order between said optical system and the image plane.

LUDWIG M. DIETERICH.